US011035269B2

(12) United States Patent
Nam

(10) Patent No.: US 11,035,269 B2
(45) Date of Patent: Jun. 15, 2021

(54) AIR CLEANER FOR VEHICLE

(71) Applicant: Chun Ok Nam, Seoul (KR)

(72) Inventor: Chun Ok Nam, Seoul (KR)

( * ) Notice: Subject to any disclaimer, the term of this patent is extended or adjusted under 35 U.S.C. 154(b) by 189 days.

(21) Appl. No.: 16/236,980

(22) Filed: Dec. 31, 2018

(65) Prior Publication Data

US 2019/0316502 A1 Oct. 17, 2019

(30) Foreign Application Priority Data

Apr. 11, 2018 (KR) .................. 10-2018-0041949

(51) Int. Cl.

| B01D 46/00 | (2006.01) |
|---|---|
| B01D 46/54 | (2006.01) |
| B01D 39/00 | (2006.01) |
| B01D 41/04 | (2006.01) |
| F01N 3/01 | (2006.01) |
| F01N 3/02 | (2006.01) |
| F01N 3/038 | (2006.01) |

(Continued)

(52) U.S. Cl.
CPC ............ *F01N 3/033* (2013.01); *F01N 3/022* (2013.01); *F01N 3/0211* (2013.01); *F01N 13/017* (2014.06); *F01N 13/1805* (2013.01); *F01N 2450/30* (2013.01)

(58) Field of Classification Search
CPC ........ B01D 46/00; B01D 46/54; B01D 39/00; B01D 41/04; F01N 3/01; F01N 3/02; F01N 3/038
USPC ................... 55/385.3, DIG. 30; 123/198 E
See application file for complete search history.

(56) References Cited

U.S. PATENT DOCUMENTS 6,355,095 B1* 3/2002 Kuo-Long ............... A61L 9/16
 55/385.3
6,463,902 B1* 10/2002 Curtis .................. F02B 61/045
 123/184.21

(Continued)

FOREIGN PATENT DOCUMENTS

CN 2608697 Y 3/2004
CN 1538868 A 10/2004

(Continued)

OTHER PUBLICATIONS

Korean Office Action for corresponding Korean application No. 10-2018-0041949 dated Jul. 2, 2018, citing the above references.

(Continued)

*Primary Examiner* — Minh Chau T Pham
(74) *Attorney, Agent, or Firm* — Hauptman Ham, LLP

(57) ABSTRACT

The invention relates to an air cleaner for a vehicle which can be installed on the rear of the vehicle, which includes a suction pipe provided with a slit having a length corresponding to a width of the vehicle, an air pump connected to inside of the suction pipe by a guide pipe, and a filter means connected to the air pump. The air cleaner is operated in a way of sucking exhaust gas and fine dust generated from an exhaust line of the vehicle together with fine dust and dust particles generated around tires of the vehicle during driving of the vehicle, removing them, and then discharging purified air to the atmosphere. The air cleaner can effectively remove the fine dust and various-shaped dust particles directly and indirectly generated from the vehicle, and remarkably reduce generation of fine dust by considerably suppressing diffusion of fine dust into atmosphere.

4 Claims, 3 Drawing Sheets

(51) Int. Cl.
  *F01N 3/033* (2006.01)
  *F01N 13/00* (2010.01)
  *F01N 3/021* (2006.01)
  *F01N 3/022* (2006.01)
  *F01N 13/18* (2010.01)

(56) References Cited

U.S. PATENT DOCUMENTS

| | | | |
|---|---|---|---|
| 7,879,124 B2* | 2/2011 | Uemura | B01D 46/0005 55/506 |
| 8,066,788 B2* | 11/2011 | Kobayashi | F01P 1/02 55/385.3 |
| 9,308,484 B1 | 4/2016 | Harper | |
| 10,286,882 B2 | 5/2019 | Mathissen et al. | |
| 2007/0209517 A1 | 9/2007 | Uemura et al. | |
| 2009/0320773 A1 | 12/2009 | Kobayashi et al. | |
| 2017/0210354 A1 | 7/2017 | Mathissen et al. | |

FOREIGN PATENT DOCUMENTS

| | | |
|---|---|---|
| CN | 1957161 A | 5/2007 |
| CN | 101138693 A | 3/2008 |
| CN | 201105191 Y | 8/2008 |
| CN | 205323413 U | 6/2016 |
| CN | 106180115 A | 12/2016 |
| CN | 106215575 A | 12/2016 |
| DE | 202005005673 U1 | 9/2005 |
| EP | 1837066 A2 | 9/2007 |
| FR | 3006605 A1 | 12/2014 |
| JP | H3-239627 A | 10/1991 |
| JP | 4297341 A | 10/1992 |
| JP | 2008-302803 A | 12/2008 |
| KR | 10-1997-0007644 B1 | 5/1997 |
| KR | 19980033569 A | 7/1998 |
| KR | 10-2015-0109812 A | 10/2015 |
| KR | 10-2016-0111552 A | 9/2016 |
| WO | 03/095808 A1 | 11/2003 |
| WO | 2018134313 A1 | 7/2018 |

OTHER PUBLICATIONS

Indian First Examination Report for corresponding Indian application No. 201914003124 dated Feb. 25, 2020, citing the above references.
Japanese Office Action for corresponding Japanese application No. 2019-008275 dated Feb. 4, 2020, citing the above references.
The extended European Search Report dated Jul. 1, 2019 in connection with the counterpart European Patent Application No. 19155968.1, citing the above reference(s).
Office Action issued for corresponding Chinese Patent Application No. 201910014838.9 dated Jan. 8, 2021, along with a partial English translation.

* cited by examiner

AIR CLEANER FOR VEHICLE

CROSS REFERENCE TO RELATED APPLICATION

The present application claims priority to Korean Patent Application No. 10-2018-0041949, filed Apr. 11, 2018, the entire contents of which is incorporated herein for all purposes by this reference.

BACKGROUND OF THE INVENTION

Field of the Invention

The present invention relates generally to an air cleaner for a vehicle which can be fixed on the rear of the vehicle and, more particularly, to an air cleaner for a vehicle which is fixed on the rear of a passenger car or a truck so as to suck exhaust gas of the vehicle and road dust caused from tires, purify and remove the exhaust gas and dust, and then discharge purified air to the outside, thereby efficiently suppressing and removing direct and indirect type fine dust.

Description of the Related Art

Generally, fine dust is reported to adversely affect the human body to be designated as a first rate cancer-causing agent by the World Health Organization (WHO) in 2013, and as air pollution becomes more severe, danger of the fine dust is emphasized as a social problem.

It is known that about 30%~50% of such fine dust is caused by yellow sand dust and smog from China, and the remaining fine dust is caused by domestic pollutants. Among domestic pollutants, exhaust gas including soot generates a considerable amount of fine dust, so self-saving plans such as the 2-day rotation driving system are considered when high concentration of fine dust is predicted.

Accordingly, as disclosed in Korean Utility Model Registration No. 20-0134974, an exhaust gas reducing apparatus of diesel vehicles has been proposed and registered. For reducing exhaust soot by collecting imperfect combustion gas discharged through an exhaust pipe, the apparatus includes the exhaust pipe, a silencer formed on the exhaust pipe, a soot collector case formed on an end of the exhaust pipe passing through the silencer, a soot collecting filter made of a metal net having a dense mesh and rotatably installed on the case, a cover attached to the case for separating and cleaning the filter, and an air supplying hole formed on a side of a lower part of the case for supplying outside air to the filter.

In addition, a soot filter apparatus of a vehicle for preventing soot emission as disclosed in Korean Utility Model Registration No. 20-0266934 has been proposed and registered. The apparatus is configured of a body integrally formed with an insertion tube which has a plurality of guide wings inside the tube, a plurality of through holes perforated on a front plate of the body, a filter inserted in the body, an opening-and-closing door formed on the bottom of the body, and fixing brackets integrally coupled to the top of the body.

In addition, as disclosed in Korean Utility Model Registration No. 20-0349378, a soot filter for a muffler of a vehicle has been proposed and registered, which is related to a soot filter directly configured as an end of a muffler of a vehicle or separately attached to the end of the muffler of the vehicle. In this case, a soot preventing case having a soot filer case purifying exhaust gas is directly configured as the end of the muffler or separately attached to the end of the muffler. In the soot filer case, as soot filters, a plurality of non-woven fabrics in a wet state with grease is provided at predetermined intervals and is opened alternately in different directions, and a screen wire mesh covered by a non-woven fabric is installed to an outlet of the soot filer case. Therefore, when soot included in exhaust gas passes through the soot filer case, the grease on the woven fabrics adsorbs carbon monoxide included in the soot, and only heat of exhaust gas excluding harmful matter is discharged through the outlet.

In addition, as disclosed in Korea Patent No. 10-1214097, a diesel particulate filter has been proposed and registered. The diesel particulate filter includes at least two filters which are provided inside a casing through which exhaust gas is passed and arranged in parallel in a direction intersecting with a flow direction of the exhaust gas, and a fixing means seated inside the casing and to which filters are fixed so that an arrangement structure of the filters is maintained. By using the diesel particulate filter, the filters can be easily maintained and repaired because the filters can be installed and replaced without disassembling the entire casing, maintenance costs can be reduced because only damaged parts of the filters are replaced, and the filters are not easily damaged by external impact or external force.

However, the conventional exhaust gas filters should be used directly installed on an end-muffler of an exhaust line of a vehicle or coupled to a middle part of the exhaust line or an end of the end-muffler. Most of these filters require replacement or improvement of the entire exhaust line depending on their structures, so they have a considerable problem to be applied to a vehicle actually operated.

In addition to exhaust gas including soot, there is no countermeasure against indirect fine dust which is indirectly generated by a vehicle when tires of the vehicle rub with a road surface and by scattering of fine dust on the road.

DOCUMENTS OF RELATED ART (Patent Document 1) Korea Utility Model Registration No. 20-0134974 "Exhaust Gas Reducing Apparatus" (date of registration, Oct. 27, 1998);

(Patent Document 2) Korea Utility Model Registration No. 20-0266934 "Soot Filter apparatus for preventing soot emission" (date of registration, Feb. 22, 2002);

(Patent Document 3) Korea Utility Model Registration No. 20-0349378 "Soot Filter for Muffler of Vehicle" (date of registration, Apr. 26, 2004); and (Patent Document 4) Korea Patent No. 10-1214097. "Diesel Particulate Filter" (date of registration, Dec. 13, 2012)

SUMMARY OF THE INVENTION

Accordingly, the present invention has been made keeping in mind the above problems occurring in the related art, and the present invention is intended to propose an air cleaner for a vehicle, which may be fixed on the rear of the vehicle, and include a suction pipe provided with a slit having a length corresponding to a width of the vehicle, an air pump connected to inside of the suction pipe by a guide pipe, and a filter means connected to the air pump.

Therefore, the purpose of the present invention is to provide an air cleaner which can suck and purify exhaust gas discharged from the muffler of the vehicle and fine dust generated around the tires of the vehicle due to driving of the vehicle thereby reducing and removing fine dust directly and indirectly generated from the vehicle.

In order to achieve the above object, according to one aspect of the present invention, there is provided an air cleaner for a vehicle, including a suction pipe provided with a slit having the length corresponding to the width of the vehicle, an air pump connected by a guide pipe to inside of the suction pipe, and a filter means 30 connected to the air pump. The slit of the suction pipe is disposed to face an end-muffler and a tire of the vehicle, and assembling brackets for fixing the suction pipe to a rear side of the vehicle are joined to opposite sides of an upper part of the suction pipe.

By operation of the air pump, polluted air is introduced through the slit into the suction pipe, the guide pipe, and the air pump and supplied to the filter means and purified thereby, and purified air is discharged to the atmosphere through an outlet formed in the filter means.

Since the air cleaner of the present invention sucks exhaust gas and fine dust generated from an exhaust line of the vehicle together with fine dust and dust particles generated around the tires of the vehicle during driving of the vehicle, removes them, and then discharges purified air to the atmosphere the fine dust and various-shaped dust particles directly and indirectly discharged from the vehicle can be effectively removed, and generation of fine dust can be remarkably reduced by considerably suppressing diffusion of fine dust into the atmosphere.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings.

Figure 1:
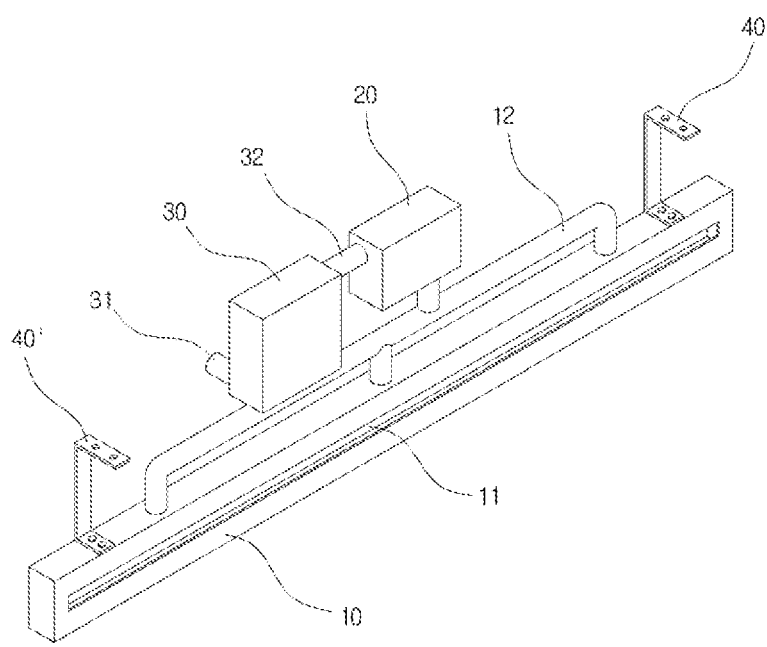
FIG. 1 is a perspective view showing an air cleaner for a vehicle according to the present invention.
Figure 2:
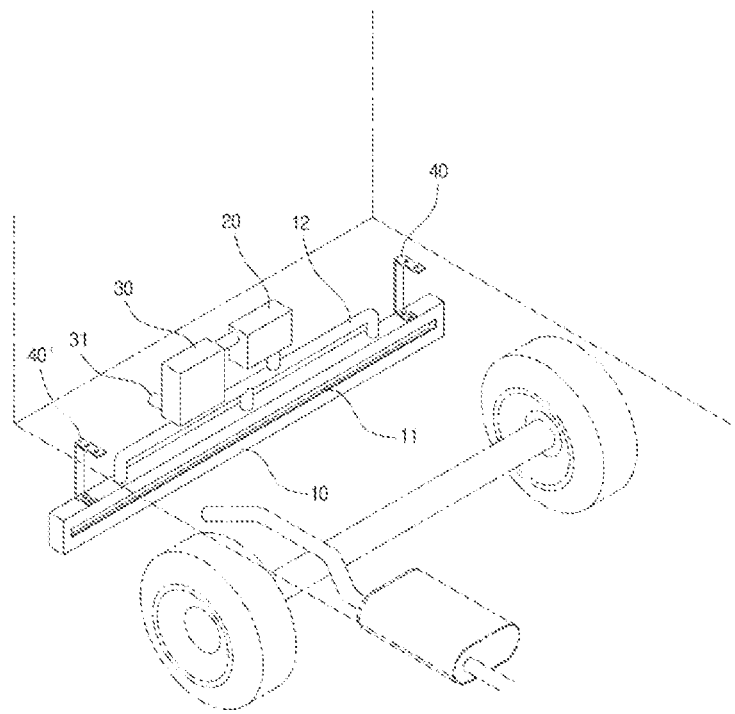
FIG. 2 is an installation view showing a vehicle in which the air cleaner for the vehicle according to the present invention is installed.
Figure 3:
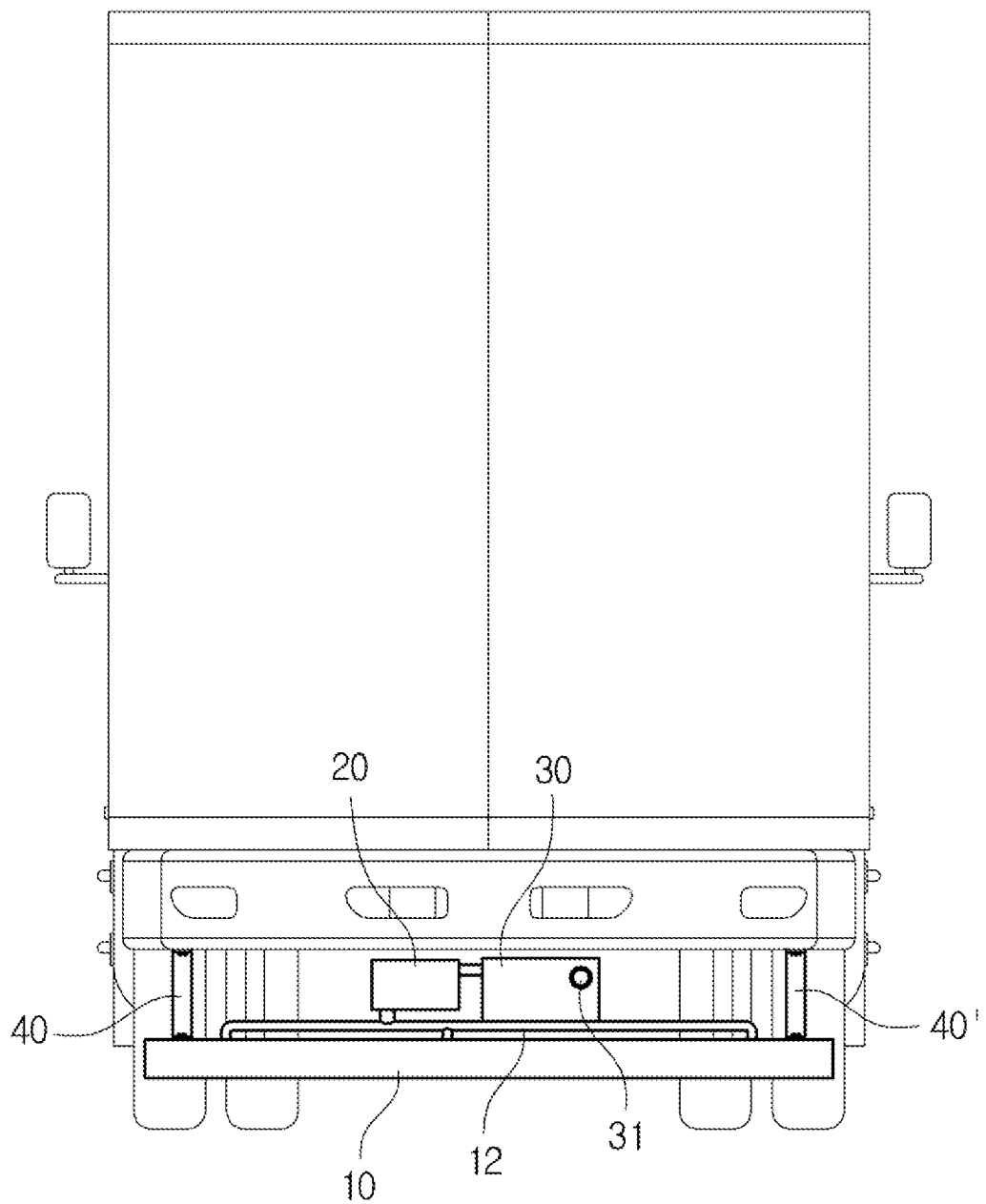
FIG. 3 is a rear view showing a truck in which the air cleaner for the vehicle according to the present invention is installed.
Figure 4:
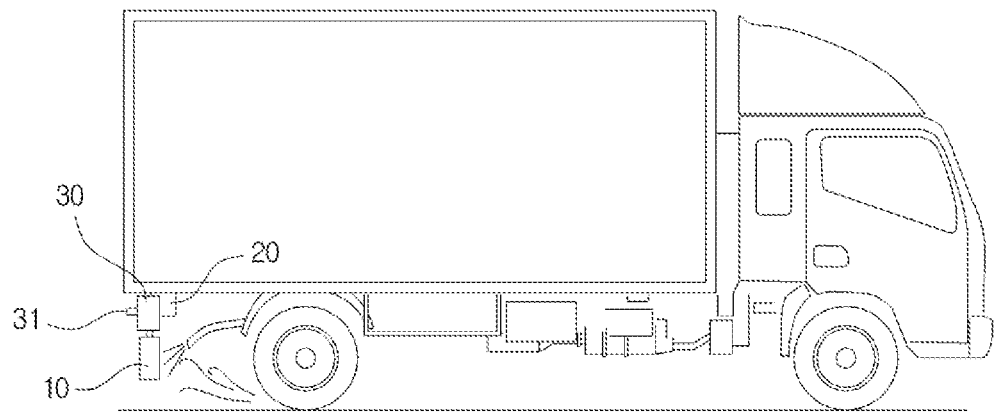
FIG. 4 is a side view showing the truck in which the air cleaner for the vehicle according to the present invention is installed.

FIG. 1 is a general perspective view showing an air cleaner for a vehicle according to the present invention. FIG. 2 is an installation view, as an example, showing a vehicle in which the air cleaner for the vehicle according to the present invention is installed. FIG. 3 is a rear view, as an example, showing a truck in which the air cleaner for the vehicle according to the present invention is installed. FIG. 4 is a side view, as an example, showing the truck in the air cleaner for the vehicle according to the present invention is installed.

As shown in the drawings, the air cleaner for the vehicle according to the present invention can remove from fine dust directly discharged from the vehicle to fine dust indirectly generated by driving of the vehicle, through the following process. The process proceeds such that the air cleaner collects exhaust gas discharged to the atmosphere from a muffler of the vehicle, i.e., an end-muffler which is the end of an exhaust line and also collects tire dust and road dust generated around tires during driving of the vehicle, and then, removes debris and soot from the collected exhaust gas and discharges purified air to the atmosphere.

Accordingly, the air cleaner for the vehicle of the present invention has a rectangular suction pipe 10 having a length corresponding to a width of the vehicle. In the suction pipe 10, a slit 11 is formed in the lateral direction on a side of the suction pipe toward the end-muffler and the tires of the vehicle, a separate air pump 20 is provided by fixing to an upper part of the suction pipe 10. The suction pipe 10 and the air pump 20 are connected to each other by a guide pipe 12.

In addition, a separate filter means 30 with an empty inside space is installed on a side of the air pump 20, which has an inlet 32 connected to the air pump 20 on a first side of the separate filter means and an outlet 31 through which inside air is discharged to the atmosphere.

Particularly, assembling brackets 40 and 40' formed by bending a metal plate are joined to opposite sides of an upper part of the suction pipe 10, so the suction pipe 10 may be fixed to a rear and under side of the vehicle using the assembling brackets 40 and 40', and thus the slit 11 of the suction pipe 10 faces the end-muffler and the tires of the vehicle.

In addition, the air pump 20 is connected to an electric device of the vehicle. Thus, when the vehicle starts, power is applied to the air pump 20 so that the air cleaner can immediately suck the exhaust gas discharged from the end-muffler.

When the air pump 20 is operated, polluted air including the exhaust gas is sucked into the suction pipe, and moves along the guide pipe 12 into the air pump 20. The polluted air is supplied to the inside of the filter means 30 along the air pump 20 and the inlet 32. Then, the filter means 30 filters various debris and fine dust from the polluted air and discharges purified air through the outlet 31.

In particular, as the air cleaner for the vehicle of the present invention can efficiently remove dust or debris generated around the tires as well as the soot and exhaust gas of the vehicle. The above-mentioned tires generates much tire dust due to friction with the road surface during driving of the vehicle, and dust, fine dust, and various debris on the road are scattered during driving of the vehicle, so that such fine dust, debris, etc. can be removed by the air cleaner while being sucked into the suction pipe 10.

Figure 5:
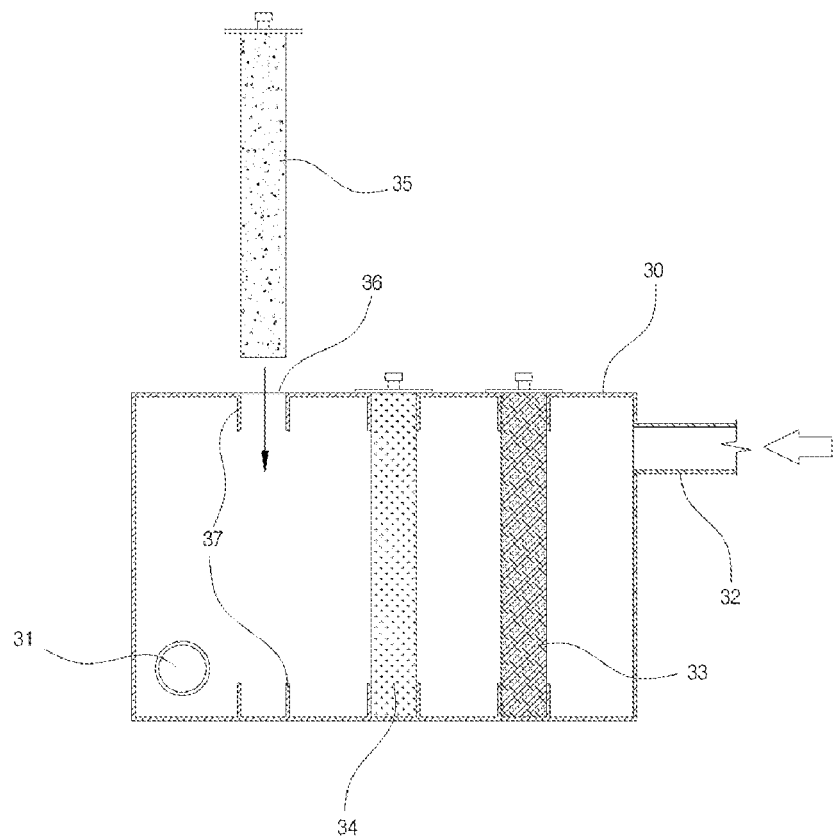
FIG. 5 is a detailed sectional view showing a filter means of the air cleaner for the vehicle according to the present invention.

In addition, the air cleaner for the vehicle of the present invention may use the filter means 30 with multi-stage filters, as shown in FIG. 5. On an upper surface of the filter means 30, a plurality of fitting holes 36 is sequentially disposed apart from the inlet 32, so that a plurality of filters may be inserted through the fitting holes 36 into the filter means 30.

Here, on a under surface of the fitting holes 36 and a lower inside of the filter means 30, filter guides 37 protrude so that various filters inserted through the fitting holes 36 into the inside of the filter means are guided along the filter guides 37 and divide the inside of the filter means 30.

In particular, a mesh filter 33, an activated carbon filter 34, and a high-efficiency particulate air filter (HEPA filter) 35 are sequentially inserted into the filter means 30. The mesh filter 33 formed by synthetic resin or a metal mesh removes relatively large particles in the polluted air supplied by the inlet 32, the activated carbon filter primarily filters the dust and fine dust from the polluted air passing through the mesh filter 33, and the HEPA filter 35 completely filters the fine dust that is harmful to the human body from the primary filtered polluted air.

Then, purified air passing through the HEPA filter 35 is discharged through the outlet 31 to the atmosphere. Therefore, the air cleaner is a more eco-friendly device which can quickly and effectively remove indirect pollutants such as tire dust and road dust as well as direct pollutants such as exhaust gas and fine dust generated from the vehicle.

In addition, the filter means 30 is very convenient for use because the filters can be periodically cleaned or replaced by being separated from the filter means 30.

Although a preferred embodiment of the present invention has been described for illustrative purposes, they are not intended to represent all of the spirit of the present invention, and those skilled in the art will appreciate that various modifications, additions and substitutions are possible, without departing from the scope and spirit of the invention as disclosed in the accompanying claims.

What is claimed is:

1. An air cleaner for a vehicle, the air cleaner comprising:
   a suction pipe provided with a slit extending in a lateral direction from a left tire of the vehicle to a right tire of the vehicle;
   a guide pipe disposed on an upper part of the suction pipe;
   an air pump connected by the guide pipe to an inside of the suction pipe; and
   a filter connected to the air pump,
   wherein
   the slit of the suction pipe is disposed to face an end-muffler and the left and right tires of the vehicle,
   a pair of assembling brackets for fixing the suction pipe to a rear side of the vehicle are joined to opposite sides of the upper part of the suction pipe,
   the air pump is operable to cause polluted air to flow through the slit into the suction pipe, the guide pipe, and the air pump to supply the polluted air to the filter to obtain purified air that is discharged to the atmosphere through an outlet in the filter,
   the air pump and the filter are disposed on the upper part of the suction pipe and between the pair of brackets in the lateral direction.

2. The air cleaner for the vehicle of claim 1, wherein the filter has
   an inlet connected to the air pump,
   the outlet through which the purified air is discharged to the atmosphere,
   a mesh filter,
   an activated carbon filter, and
   a high-efficiency particulate air filter (HEPA filter), and
   wherein the mesh filter, the activated carbon filter, and the HEPA filter are sequentially disposed while being spaced apart from each other between the inlet and the outlet of the filter.

3. The air cleaner for the vehicle of claim 2, wherein the filter further has
   fitting holes on an upper part of the filter, and
   filter guides protruding below the fitting holes and inside the filter, and wherein the filter guides are configured to guide the mesh filter, the activated carbon filter, and the HEPA filter to be removably installed through the fitting holes.

4. The air cleaner for the vehicle of claim 3, wherein the mesh filter, the activated carbon filter, and the HEPA filter are in direct contact with the filter guides.

* * * * *